(12) United States Patent
Zhao et al.

(10) Patent No.: US 11,085,854 B2
(45) Date of Patent: Aug. 10, 2021

(54) NON-WATER-COOLED HIGH TEMPERATURE AEROSOL QUANTITATIVE DILUTION SAMPLING PROBE

(71) Applicant: HUAZHONG UNIVERSITY OF SCIENCE AND TECHNOLOGY, Hubei (CN)

(72) Inventors: Haibo Zhao, Hubei (CN); Zuwei Xu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 124 days.

(21) Appl. No.: 16/621,697

(22) PCT Filed: Jun. 7, 2018

(86) PCT No.: PCT/CN2018/090250
§ 371 (c)(1),
(2) Date: Dec. 12, 2019

(87) PCT Pub. No.: WO2019/174138
PCT Pub. Date: Sep. 19, 2019

(65) Prior Publication Data
US 2021/0148794 A1    May 20, 2021

(30) Foreign Application Priority Data

Mar. 16, 2018    (CN) .......................... 201810219681.9

(51) Int. Cl.
*G01N 1/24*    (2006.01)
*G01N 1/38*    (2006.01)
*G01N 1/22*    (2006.01)

(52) U.S. Cl.
CPC .................. *G01N 1/24* (2013.01); *G01N 1/38* (2013.01); *G01N 2001/2223* (2013.01); *G01N 2001/2285* (2013.01)

(58) Field of Classification Search
CPC ... G01N 2001/2223; G01N 2001/2264; G01N 1/2252; G01N 1/24; G01N 1/2258; G01N 2001/225; G01N 1/2247; G01N 2001/2261
See application file for complete search history.

(56) References Cited

U.S. PATENT DOCUMENTS 3,662,605 A * 5/1972 Grotyohann ....... G01N 15/0205
                                                                73/864.33
3,672,225 A * 6/1972 Louis .................... G01N 1/2247
                                                                73/863.58

(Continued)

FOREIGN PATENT DOCUMENTS

| EP | 0042800 A1 * | 12/1981 | ........... G01N 1/2252 |
| EP | 2586321 A1 * | 5/2013 | ............. A24F 40/80 |
| WO | WO-2019174138 A1 * | 9/2019 | ............... G01N 1/22 |

*Primary Examiner* — David A. Rogers
(74) *Attorney, Agent, or Firm* — JCIPRNET

(57) ABSTRACT

A non-water-cooled high temperature aerosol quantitative dilution sampling probe includes a dilution gas tube, a gas mixing tube, a sampling nozzle and a three-way shunt tube, in which the dilution gas tube is used for introducing a dilution gas, and forms, together with a gas mixing tube coaxially fitted therein, an annular passage for transporting the dilution gas; and the sampling nozzle is composed of an injection hole, an outer nozzle and an inner nozzle, and an annular gas flow gap formed between the inner nozzle and the gas mixing tube accelerates the flow of the dilution gas, and forms a negative pressure around the inner nozzle, thereby achieving the purpose of sucking the sample gas by the outer nozzle and mixing it with the dilution gas.

6 Claims, 3 Drawing Sheets

(56) References Cited

U.S. PATENT DOCUMENTS

| | | | | | |
|---|---|---|---|---|---|
| 3,759,087 | A | * | 9/1973 | Iwao | G01N 1/2247 73/863.12 |
| 3,841,145 | A | * | 10/1974 | Boubel | G01N 1/2202 73/863.03 |
| 3,903,745 | A | * | 9/1975 | Bolser | G01N 1/2258 73/863.21 |
| 3,921,458 | A | * | 11/1975 | Logan | G01N 1/2247 73/863.58 |
| 4,034,611 | A | * | 7/1977 | Horling | G01N 1/2202 73/863.12 |
| 4,061,467 | A | * | 12/1977 | Becker | G01N 1/2258 73/864.34 |
| 4,100,806 | A | * | 7/1978 | Carbonnelle | G01N 1/2258 73/863.11 |
| 4,154,088 | A | * | 5/1979 | Werner | G01N 1/2258 73/28.01 |
| 4,361,027 | A | * | 11/1982 | Schmitt | G01K 1/14 374/142 |
| 4,630,464 | A | * | 12/1986 | Maul | G01N 15/06 73/23.33 |
| 4,686,848 | A | * | 8/1987 | Casselberry | B01D 46/42 73/38 |
| 4,856,352 | A | * | 8/1989 | Daum | G01N 1/2247 73/863.25 |
| 4,883,505 | A | * | 11/1989 | Lucero | G01N 1/2273 95/154 |
| 5,109,711 | A | * | 5/1992 | Wendt | G01N 1/2258 73/863.03 |
| 5,473,951 | A | * | 12/1995 | Tomlin | G01N 1/2247 73/863.83 |
| 5,493,923 | A | * | 2/1996 | Balfanz | G01N 33/0049 73/863.21 |
| 5,777,241 | A | * | 7/1998 | Evenson | G01N 1/2258 73/863.11 |
| 5,844,148 | A | * | 12/1998 | Klein | G01N 1/2226 73/863.82 |
| 6,357,305 | B1 | * | 3/2002 | Witt | G01N 1/2035 73/863.53 |
| 6,481,299 | B2 | * | 11/2002 | Silvis | G01N 1/2252 73/863.81 |
| 6,742,407 | B2 | * | 6/2004 | Silvis | G01N 1/2252 73/864.73 |
| 6,857,327 | B2 | * | 2/2005 | Silvis | G01N 1/2252 73/863.11 |
| 7,044,009 | B2 | * | 5/2006 | Graze, Jr. | G01N 1/2252 73/863.03 |
| 7,549,350 | B2 | * | 6/2009 | Graze, Jr. | G01N 1/2252 73/23.31 |
| 8,171,807 | B2 | * | 5/2012 | Carichon | G01N 1/2247 73/863.51 |
| 9,534,988 | B2 | * | 1/2017 | Karki | F23N 5/003 |
| 10,770,277 | B2 | * | 9/2020 | Datwani | H01J 49/0031 |
| 10,998,179 | B2 | * | 5/2021 | Arnold | H01J 49/0404 |
| 2004/0191130 | A1 | * | 9/2004 | Marek | G01N 33/0016 422/109 |
| 2007/0125188 | A1 | * | 6/2007 | Kreft | G01N 1/2252 73/864.73 |
| 2007/0137314 | A1 | * | 6/2007 | Watson | G01N 1/38 73/863 |
| 2014/0130615 | A1 | * | 5/2014 | Karki | G01N 1/2202 73/863.21 |
| 2015/0377750 | A1 | * | 12/2015 | Scipolo | G01N 1/2258 73/29.01 |
| 2020/0365382 | A1 | * | 11/2020 | Arnold | H01J 49/0468 |

\* cited by examiner

NON-WATER-COOLED HIGH TEMPERATURE AEROSOL QUANTITATIVE DILUTION SAMPLING PROBE

CROSS-REFERENCE TO RELATED APPLICATION

This application is a 371 of international application of PCT application serial no. PCT/CN2018/090250, filed on Jun. 7, 2018, which claims the priority benefit of China application no. 201810219681.9, filed on Mar. 16, 2018. The entirety of each of the above mentioned patent applications is hereby incorporated by reference herein and made a part of this specification.

BACKGROUND

Technical Field

The present disclosure belongs to the field of fine particles analysis and measurement related equipment, and more particularly relates to a non-water-cooled high temperature aerosol quantitative dilution sampling probe.

Description of Related Art

In high-temperature gas-solid two-phase flow systems such as soot flames and aerosol flames, the characteristics (including application-oriented functionalities and environmental health effects) of nanoparticles depend mainly on their composition, structure and size. Therefore, controlling these characteristics and understanding their evolution are important for nanomaterial production and environmental protection. Online real-time monitoring technology is the inevitable choice to study the formation, growth and functionalization of nanoparticles. However, the corresponding diagnosis is still challenging, especially during the production of nanoparticles with high concentration at high temperature.

Specifically, in the online sampling and diagnosis technique, it is necessary to ensure that the physicochemical properties are stable in the process of transporting a sample of gas and particle mixture from the measurement point to the detector, including quenching chemical reactions, minimizing particle coagulation, and controlling the temperature and the species concentration to meet detection limits of the detector. At present, it is prevailing to insert a sampling probe into flames, which aspirates a small amount of sample, and quickly mixes it with a cold dilution gas to reduce the temperature and concentration of the sample. Then, the size distribution of the particles is analyzed by a scanning mobility particle sizer (SMPS), and the composition of the gas is analyzed by a gas chromatograph (GC) or a flue gas analyzer. In the actual production, it is necessary to monitor the in-situ concentration of the particles and the gas components, and thus, the ratio of dilution gas to sample gas, i.e., the dilution ratio, must be accurately and quantitatively controlled during the sampling process.

Further studies have shown that the dilution ratio has many influence factors, including probe geometry, working pressure drop, sample gas temperature, dilution gas flow rate and temperature, and so on. However, at present, the dilution gas temperature is a factor that is difficult to control and quantify in the prior art. For example, in order to prevent the heating effect of the high temperature flame on the dilution gas, the dilution sampling probe in the prior art is generally protected by a water-cooled casing to stabilize the temperature of the dilution gas. However, in fact, the water-cooled casing and its accessories make the sampling probe increased in volume and complicated in structure, directly resulting in change of the flame structure and reconstruction of the flame temperature distribution. This disturbance to the flame greatly increases the uncertainty of the sampling analysis. Accordingly, there is an urgent need in the art for further refinements to better meet the complex needs in the field of fine particle analysis and measurement.

SUMMARY

In view of the above-described defects or improvement requirements in the art, the present disclosure provides a non-water-cooled high temperature aerosol quantitative dilution sampling probe, in which key components, such as sampling nozzle, dilution gas tube and gas mixing tube, are designed and improved in terms of specific structure, setting mode and working principle. Thereby, water cooling is not needed and hence disturbances of the sampling probe on flames can effectively be avoided. Meanwhile, the adjustable range of the working pressure drop of the sampling probe is significantly increased. In addition, the sampling probe has the advantages of compact structure, convenient operation and high accuracy and so on.

In order to achieve the above purposes, according to the present disclosure, there is provided a non-water-cooled high temperature aerosol quantitative dilution sampling probe and the sampling probe comprises a dilution gas tube, a gas mixing tube, a sampling nozzle and a three-way shunt tube.

One end of the dilution gas tube is controllably connected with a gas source providing a dilution gas, and an inlet pressure is monitored by a first piezometer; the gas mixing tube is coaxially fitted in an interior of the dilution gas tube, and an annular passage is formed between the dilution gas tube and the gas mixing tube, thereby transporting the dilution gas to a distal end of the gas mixing tube via the annular passage.

The sampling nozzle is hermetically coupled to the other end of the dilution gas tube, and consists of a sample injection hole, an outer nozzle and an inner nozzle, wherein the inner nozzle is disposed around the sample injection hole, and an annular gas flow gap is formed between the inner nozzle and the distal end of the gas mixing tube, so that the dilution gas is continuously injected into the gas mixing tube via the annular gas flow gap, and a negative pressure is simultaneously formed in a vicinity of the inner nozzle. The outer nozzle is also disposed around the sample injection hole, with an injection direction of the outer nozzle opposite to that of the inner nozzle, so that a sample gas in a vicinity of the outer nozzle is sucked into the gas mixing tube through the sample injection hole, and then mixed with the dilution gas.

In addition, the sampling probe further has a second piezometer for monitoring an outlet pressure of the proximal end (i.e., an outlet end) of the gas mixing tube. The proximal end of the gas mixing tube is connected to the three-way shunt tube, and other two joints of the three-way shunt tube are respectively connected to a vacuum modulation valve and a particle analysis detector, thereby performing analysis and detection on the sample gas after dilution and mixing.

Preferably, the sampling nozzle is made of a heat-resisting material with a low thermal conductivity of less than 1 W/(m·K), and has a length designed to be greater than a depth of the probe into the flame.

Further preferably, a key structural parameter of the annular gas flow gap is designed as follow: a flow area of the annular gas flow gap is smaller than a flow area of the annular passage between the dilution gas tube and the gas mixing tube.

Further preferably, the inner nozzle is also designed with a taper angle ranging from 60° to 120°.

Further preferably, the sampling probe uses a vacuum regulator to adjust a working pressure drop ΔP, and does not require a secondary supplementary gas system to adjust the working pressure drop.

Further preferably, the sampling nozzle, the dilution gas tube and the gas mixing tube are designed as detachable structures.

Further preferably, there is a linearizable function relationship between the dilution ratio and the working pressure drop of the sampling probe.

In general, by comparing the above technical solution of the present inventive concept with the prior art, the present disclosure has the following beneficial effects:

1. The disclosure redesigns the overall structure of the sampling probe based on the process characteristics of the nanoparticle detection and analysis, and makes targeted research and improvement on the specific compositions, setting modes, and working principle of key components. Thereby, the working process does not require water cooling, in which the disturbances on flames and the uncertainty of sampling analysis are effectively reduced.

2. More practical tests show that through the structural design of the sampling nozzle including the inner nozzle and the outer nozzle, the adjustable range of the working pressure drop of the sampling probe can be increased, and the disturbances of the sampling probe on the flow field and temperature field of the flame are reduced, thereby to minimize the uncertainties of measurement.

3. The sampling probe of the disclosure has compact structure, and is easy to operate and replace. In addition, the study results identify that the dilution ratio of a room-temperature calibration is not affected by the flame temperature in a wide range. Thereby the dilution ratio can be accurately quantified.

4. The disclosure further optimizes the key structural parameters of the sampling nozzle. For example, a tapered inner nozzle with a specific cone angel range further expands the adjustable range and accuracy of the working pressure drop ΔP, and the vacuum regulator is used to adjust the working pressure drop ΔP, without the secondary supplementary gas system. These configurations can help to simplify the system and operating.

BRIEF DESCRIPTION OF THE DRAWINGS

In all figures, the same elements or structures are denoted by the same reference numerals, in which.

DESCRIPTION OF THE EMBODIMENTS

For clear understanding of the objectives, features and advantages of the present disclosure, detailed description of the present disclosure will be given below combined with accompanying drawings and specific embodiments. It should be noted that the embodiments described herein are only meant to explain the present disclosure, and not to limit the scope of the present disclosure. Furthermore, the technical features involved in the various embodiments of the present disclosure described below can be combined with each other if they are not mutually exclusive.

Figure 1:
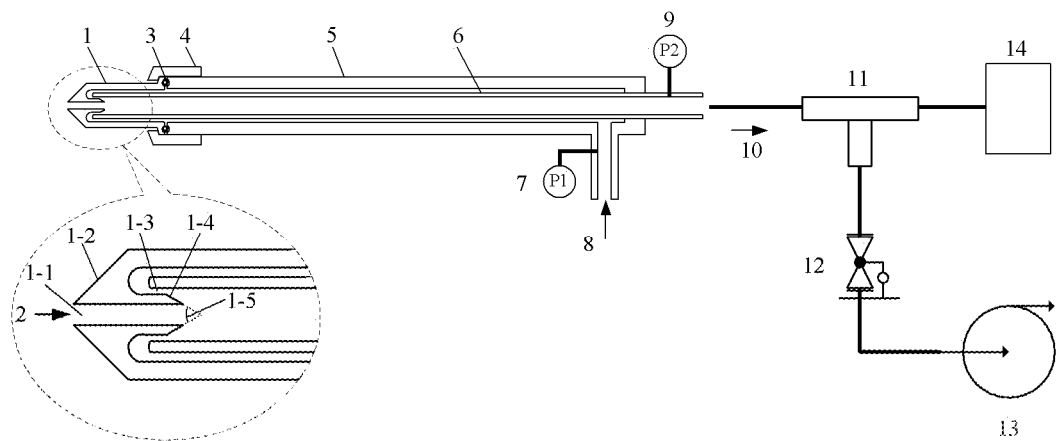
FIG. 1 is a schematic diagram showing the structural composition of a non-water-cooled high temperature aerosol quantitative dilution sampling probe according to the present disclosure.

FIG. 1 is a schematic diagram showing the structural composition of a non-water-cooled high temperature aerosol quantitative dilution sampling probe according to the present disclosure. As shown in FIG. 1, the sampling probe includes components such as a dilution gas tube 5, a gas mixing tube 6, a sampling nozzle 1 and a three-way shunt tube 11, which will be specifically described below one by one.

One end of the dilution gas tube 5 (the right end shown in the figure) is controllably connected with a gas source providing dilution gas 8, and the inlet pressure is monitored by an associated first piezometer (P1) 7; the gas mixing tube 6 is coaxially fitted in the interior of the dilution gas tube 5 by screwing, and an annular passage is formed between the gas mixing tube 6 and the dilution gas tube 5, thereby transporting the dilution gas 8 to the distal end (i.e., the left end shown in the figure) of the gas mixing tube 6 via the annular passage.

The sampling nozzle 1 can be hermetically coupled to the other end (the left end shown in the figure) of the dilution gas tube 5 through a clamp nut 4 and a sealing ring 3, and is composed of a sample injection hole 1-1, an outer nozzle 1-2 and an inner nozzle 1-4. As shown in FIG. 1, the inner nozzle 1-4 is disposed around the sample injection hole 1-1, and an annular gas flow gap 1-3 is formed between the inner nozzle 1-4 and the distal end of the gas mixing tube 6, so that the dilution gas 8 is continuously injected into the gas mixing tube 6 via the annular gas flow gap 1-3, and a negative pressure is formed near the inner nozzle. For the outer nozzle 1-2, it is also disposed around the sample injection hole 1-1, for example, is oppositely disposed at the same end of the dilution gas tube, with the injection direction of the outer nozzle 1-2 opposite to that of the inner nozzle, so that sample gas 2 in a vicinity of the outer nozzle is sucked into the gas mixing tube 6 through the sample injection hole 1-1, and then mixed with the dilution gas.

In addition, the proximal end (the right end shown in the figure) of the gas mixing tube 6 is connected to the three-way shunt tube 11, and other two joints of the three-way shunt tube can be respectively connected to a vacuum modulation valve 12 and a particle analysis detector 14, thereby performing analysis and detection on the sample gas after dilution and mixing.

When the sampling probe according to the present disclosure is operated, a dilution gas 8 with a certain flow rate (measured by a gas mass flow controller) and a certain inlet pressure enters the dilution gas tube 5, and the inlet pressure is measured by the first piezometer (P1) 7. The dilution gas flows in the annular passage between the dilution gas tube 5 and the gas mixing tube 6, then flows through the annular gas flow gap 1-3 composed by the mixed gas tube and the sampling nozzle, and finally forms an annular jet gas flow around the inner nozzle into the gas mixing tube. Since this process forms a negative pressure zone (ejection principle) near the inner nozzle, the sample gas 2 at the outer nozzle can be sucked through the sample injection hole and mixed with the dilution gas. The outlet pressure of the mixed gas 10 in the gas mixing tube is measured by a second piezometer (P2) 9. The mixed gas flows into the three-way shunt tube, so that a part of the mixed gas enters the detector 14 for analysis, and the rest of the mixed gas is dissipated by a vacuum pump 13. The dilution ratio DR of the sampling probe is defined as the ratio of the analyte concentration of the sample gas 2 to that of the outlet mixed gas 10. The dilution ratio DR needs to be quantified by a room-temperature calibration procedure, in which a relationship between DR and working pressure drop $\Delta P$ (=P1-P2) is determined at a constant flow rate of the dilution gas, and the working pressure drop $\Delta P$ is adjusted by the vacuum modulation valve.

According to a preferred embodiment of the present disclosure, the sampling nozzle 1 is preferably made of a heat-resistant material having a low thermal conductivity (specifically, a thermal conductivity of less than 1 W/(m·K)), and the length of the sampling nozzle 1 should be greater than the depth of the probe into the flame to prevent the dilution gas from being heated by the flame when the sampling probe is inserted into the flame for sampling, thus ensuring that the dilution ratio DR is not affected by the flame temperature.

Figure 2:
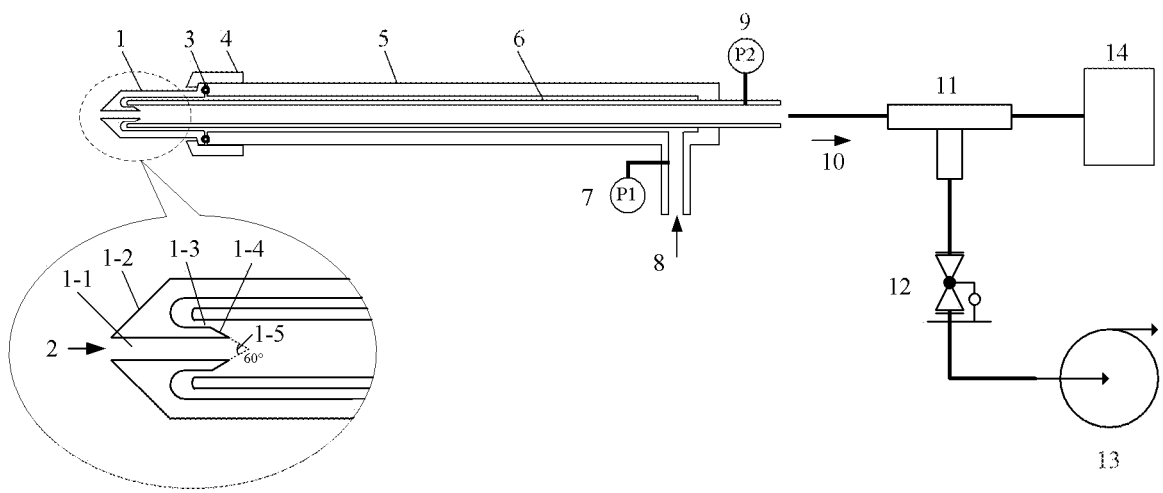
FIG. 2 is a more detailed schematic diagram showing the structural composition of the sampling probe having a specific tapered inner nozzle in accordance with a preferred embodiment of the present disclosure.

According to another preferred embodiment of the disclosure, for the inner nozzle 1-4 playing one of the critical roles, it is preferably designed to have a taper angle 1-5, and more actual tests indicate that the magnitude of the taper angle directly affects the adjustable range of the working pressure drop $\Delta P$. Accordingly, as shown in FIG. 2, after the subsequent numerical simulations and actual comparison tests, it is finally determined that the appropriate taper angle range is 60 to 120°.

According to another preferred embodiment of the present disclosure, the flow area of the annular gas flow gap 1-3 is less than that of the annular passage between the dilution gas tube and the gas mixing tube, so that the injection velocity of the gas after passing through the gap 1-3 is accelerated.

In addition, key parameters of the sampling probe according to the present disclosure are, in order of size from small to large, a diameter of the sample injection hole, a diameter of the inner nozzle, an inner diameter of the gas mixing tube, an outer diameter of the gas mixing tube, an inner diameter of the sampling nozzle and an outer diameter of the sampling nozzle.

Figure 3:
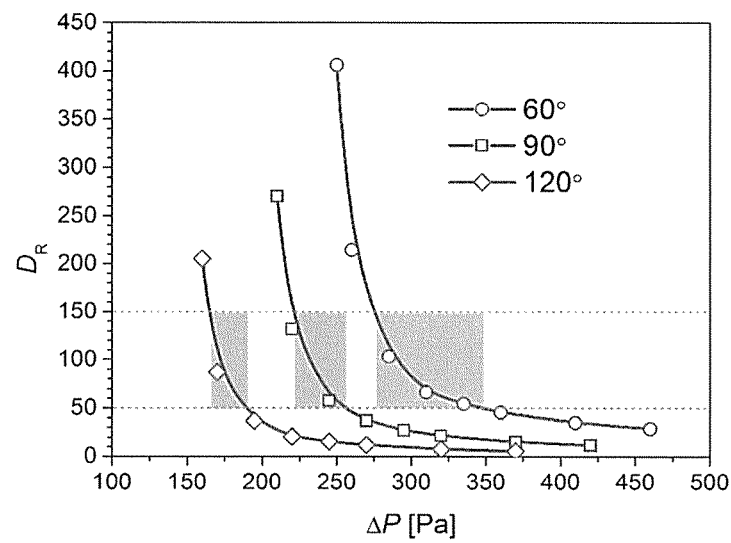
FIG. 3 is a graph showing the relationship between the dilution ratio and the working pressure drop of the sampling probe for three different taper angles based on numerical simulations.
Figure 4:
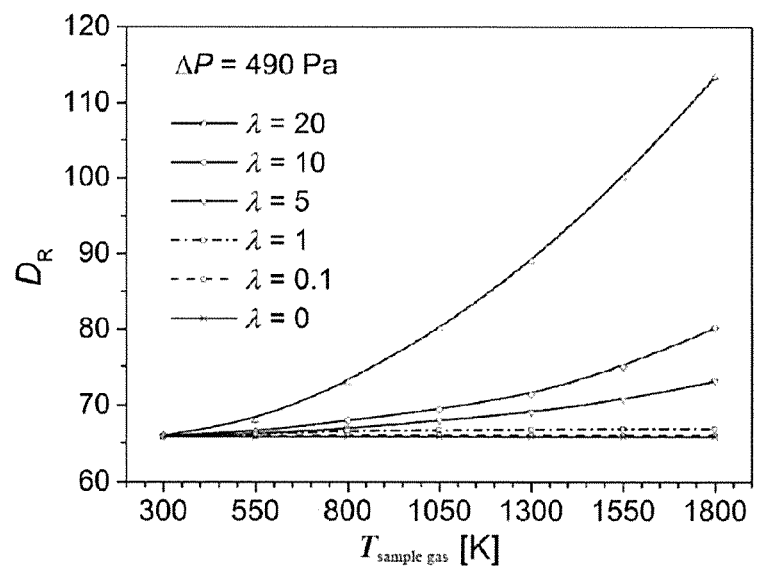
FIG. 4 is a graph showing the dilution ratio of the sampling probe as a function of temperature for different thermal conductivities of the nozzle based on numerical simulations.
Figure 5:
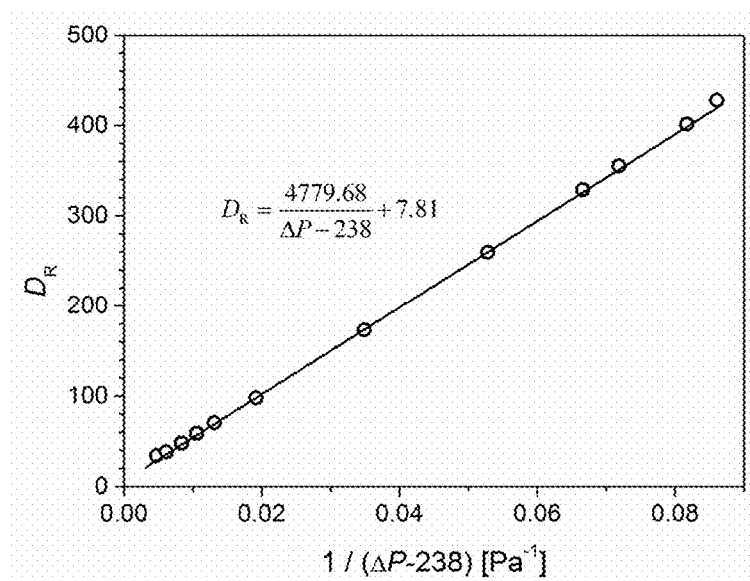
FIG. 5 is a graph showing the relationship between the dilution ratio and the working pressure drop based on experimental measurements in accordance with the present disclosure.

The performance of the above-described sampling probe according to the present disclosure in actual operations will be described in more detail below with reference to FIGS. 3-5.

We simulated the dilution sampling probe shown in FIG. 2 using computational fluid dynamics software. In the numerical simulation, the temperature is set to 300 K, the sample gas 2 is oxygen, the dilution gas 8 is nitrogen (the flow rate is 10 L/min), the dilution ratio DR is the ratio of the oxygen concentration of the sample gas to that of the outlet mixed gas, and the taper angle of the inner nozzle is changed from 60°, 90° to 120°. We found that under the same working pressure drop, the smaller the taper angle is, the larger the dilution ratio gets, and the smaller taper angle brings about a wider pressure drop range. As shown in FIG. 3, when the dilution ratio DR is in an appropriate range from 50 to 150, the pressure drop of the 60° nozzle varies from 346 to 275 Pa, and the pressure drop of the 120° nozzle varies in a narrower range (190 to 165 Pa). Therefore, the sampling probe of the 60° nozzle is the easiest to adjust during the actual operation. Taking into account the actual manufacturing and using, this angle cannot be reduced without limit, and thus, we choose a taper angle to be in a range of 60 to 120°.

Six different cases are considered in the computational fluid dynamics simulations, in which thermal conductivities ($\lambda$) of the sampling nozzle are set to 0, 0.1, 1, 5, 10 and 20 W/(m·K) respectively. At a working pressure drop $\Delta P$=490 Pa, the dilution ratios DR are compared in the six cases, as a function of sample gas temperature $T_{sample\ gas}$. As shown in FIG. 4, the effect of the sample gas temperature $T_{sample\ gas}$ on the dilution ratio DR reduces with the thermal conductivity $\lambda$ decreasing. When the thermal conductivity $\lambda$ is decreased to 1 or less, the dilution ratio DR remains basically constant. Metal materials generally have a relatively high thermal conductivity. For example, the thermal conductivity of stainless steel is about 20 W/(m·K). If the sampling nozzle is made of stainless steel, it is difficult to determine the dilution ratio DR because of the significant influence of sample gas temperature.

In this embodiment, the sampling nozzle is made of a glass material that has a thermal conductivity of about 0.8 W/(m·K). The sampling nozzle 1 is spliced to the dilution gas tube 5 by a clamp nut 4, and the connection surface of the joint is sealed by a heat-resistant O-type sealing ring 3, in which the material of the sealing ring is a heat-resistant rubber, and the material of the clamp nut is brass. The materials of the dilution gas tube 5 and the gas mixing tube 6 are stainless steel. The sample gas 2 is NaCl aerosol generated by an aerosol generator, the dilution gas 8 is nitrogen, the flow rate of the dilution gas entering the dilution gas tube 5 is 10 L/min (measured by a gas mass flow controller), and the inlet pressure is measured by a piezometer (P1) 7.

During the test, the dilution gas flows in the annular passage between the dilution gas tube and the gas mixing tube, then flows through the annular gas flow gap between the gas mixing tube and the sampling nozzle, and eventually forms an annular jet gas flow around the inner nozzle into the gas mixing tube. This process creates a negative pressure zone (ejection principle) near the inner nozzle, and then the sample gas 2 at the outer nozzle can be sucked through the sample injection hole and mixed with the dilution gas. The outlet pressure of the mixed gas 10 in the gas mixing tube is measured by a piezometer (P2) 9. The mixed gas flows into a three-way shunt tube, and then a part of the mixed gas enters the detector 14 (scanning mobility particle sizer) for analysis, and the rest of the mixed gas is dissipated by a vacuum pump 13. The dilution ratio DR of the sampling probe is the ratio of the number concentration of NaCl particles in the sample gas 2 to the number concentration of NaCl particles in the mixed gas 10. The working pressure drop $\Delta P$ is adjusted by a vacuum modulation valve, and dilution ratios DR under different working pressure drops $\Delta P$ are measured. After linearizing and fitting the data, a function relationship DR=4779.68/($\Delta P$−238)+7.81 is plotted, as shown in FIG. 5.

In summary, in the present disclosure, compared with the prior art, the key components are designed and improved in terms of specific structure, setting modes and working principle. Without a water cooling configuration, these improvements can effectively prevent the dilution gas from being heated by the flame, compared with the conventional dilution sampling probe. Other advantages include: the disturbances on the flow field and temperature field of the flame are reduced, thereby to minimize the uncertainties of measurement; (2) the dilution ratio calibrated and quantified at room temperature is not affected by the flame temperature, and can apply to a wide range of sample gas temperature; (3) the sampling nozzle, the dilution gas tube and the gas mixing tube are designed as detachable structures, so that the sampling nozzle can be conveniently replaced according to different measurement needs; (4) the secondary supplementary gas system is not required because of the vacuum regulator used to adjust the working pressure drop $\Delta P$; and (5) a tapered inner nozzle effectively magnifies the adjustable range and improves the accuracy of the working pressure drop $\Delta P$.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A non-water-cooled high temperature aerosol quantitative dilution sampling probe, the sampling probe comprising a dilution gas tube, a gas mixing tube, a sampling nozzle and a three-way shunt tube, wherein one end of the dilution gas tube is controllably connected with a gas source providing a dilution gas, and an inlet pressure is monitored by a first piezometer; the gas mixing tube is coaxially fitted in the interior of the dilution gas tube, and an annular passage is formed between the gas mixing tube and the dilution gas tube, thereby transporting the dilution gas to a distal end of the gas mixing tube via the annular passage;

the sampling nozzle is hermetically coupled to another end of the dilution gas tube, and is composed of a sample injection hole, an outer nozzle and an inner nozzle, wherein the inner nozzle is disposed around the sample injection hole, and an annular gas flow gap is formed between the inner nozzle and the distal end of the gas mixing tube, so that the dilution gas is continuously injected into the gas mixing tube via the annular gas flow gap, and a negative pressure is simultaneously formed in a vicinity of the inner nozzle; the outer nozzle is also disposed around the sample injection hole, with an injection direction of the outer nozzle opposite to that of the inner nozzle, so that a sample gas in a vicinity of the outer nozzle is sucked into the gas mixing tube through the sample injection hole, and then mixed with the dilution gas; and a proximal end of the gas mixing tube is connected to the three-way shunt tube, and other two joints of the three-way shunt tube are respectively connected to a vacuum modulation valve and a particle analysis detector, thereby performing analysis and detection on the sample gas after dilution and mixing.

2. The non-water-cooled high temperature aerosol quantitative dilution sampling probe according to claim 1, wherein the sampling probe further has a second piezometer for monitoring an outlet pressure of the proximal end, serving as an outlet end, of the gas mixing tube.

3. The non-water-cooled high temperature aerosol quantitative dilution sampling probe according to claim 1, wherein the sampling nozzle is preferably made of a heat-resistant material having a thermal conductivity of less than 1 W/(m·K), and has a length designed to be greater than a depth of the probe into the flame.

4. The non-water-cooled high temperature aerosol quantitative dilution sampling probe according to claim 1, wherein a key structural parameter of the annular gas flow gap is designed as follow: a flow area of the annular gas flow gap is smaller than a flow area of the annular passage between the dilution gas tube and the mixed gas tube.

5. The non-water-cooled high temperature aerosol quantitative dilution sampling probe according to claim 1, wherein the inner nozzle is also designed with a taper angle ranging from 60° to 120°.

6. The non-water-cooled high temperature aerosol quantitative dilution sampling probe according to claim 1, wherein the sampling nozzle, the gas mixing tube and the dilution gas tube are designed in a detachable structure.

* * * * *